Patented Sept. 16, 1952

2,610,941

UNITED STATES PATENT OFFICE 2,610,941

HAIR-DYE COMPOSITIONS

Eugène Schueller, Paris, France, assignor to Societe L'Oreal, Paris, France, a corporation of France No Drawing. Application January 16, 1948, Serial No. 2,810. In France December 14, 1946

Section 1, Public Law 690, August 8, 1946
Patent expires December 14, 1966

4 Claims. (Cl. 167—88)

Hair dyes generally used currently contain oxidizable bases such as paraphenylenediamine, aminophenols or a mixture of substances so selected that they are adapted, through subsequent oxidizing on the fibre, to give rise to the formation of colouring materials of the indamine, indophenol, azinic and the like types.

Because of their inherent character such solutions are easily oxidizable in the atmosphere and rapidly deteriorate. To overcome this drawback, such solutions usually have added thereto reducing agents such as sodium bisulfite, hydrosulfites, and the like. Such agents however offer the drawback of being detrimental to the preservation or storage characteristics of dyeing creams.

The applicant has discovered that the thioreducing agents offer the advantage of affording better protection to the dye solution against oxidizing, without interfering with satisfactory storage properties of dye creams. An object of the present invention is to apply said thio-reducers to hair dyes in order to ensure proper preservation thereof. Another object is to provide the new product of manufacture formed by a hair dye embodying in its composition a thio-reducer serving the function of an antioxidizer.

Thio-reducers suitable for carrying out the invention may, merely by way of indication and without in any way intending to restrict the scope of the invention, comprise:

(a) Non-polarised mercaptans such as thioglycerol, thio-tetraglycol, the dimercaptans (polymercaptans, polyglycols in general);

(b) Acid-substituted mercaptans (thioglycollic acid, thio-glycerin acid, polythiomuccinic acid, mercaptosuccinic acid, thiocitric acid and the like);

(c) Alkali-substituted mercaptans (mercaptoethylguanidine, mercapto-ethyltaurine, and the like), and other suitable thio-reducers.

At the same time, according to a feature of the invention, the electrolytes present (which are more or less detrimental to a uniform colour rise and penetration of the dye) are reduced to a minimum through the use of amines, diamines, phenols and aminophenol, in free state and not in the form of the salts thereof, and more generally not in the form of any mineral salts (chlorides, sulfates and the like).

Some examples of liquid dye compositions will now be given to serve as an illustration of the manner in which the invention may be carried into practice and without any intention of restricting the scope thereof.

Example I (BLACK)

| | | |
|---|---|---|
| Paraphenylene diamine | g | 2.5 |
| Aminodiphenylamine | g | 0.2 |
| 20% ammonia solution | cc | 10 |
| Thioglycollic acid | g | 0.15 |
| Water to make | cc | 100 |

Example II (BROWN)

| | | |
|---|---|---|
| Paratoluylene diamine | g | 2.5 |
| Paraaminophenol | g | 1 |
| 20% ammonia solution | cc | 10 |
| Thioglycollic acid | g | 0.1 |
| Water to make | cc | 100 |

Example III (BLOND)

| | | |
|---|---|---|
| Paraphenylene diamine | g | 1.5 |
| Paraaminophenol | g | 0.8 |
| Ammonia solution | cc | 10 |
| Thioglycollic acid | g | 0.1 |
| Water to make | cc | 100 |

It is desirable to add to the above formulae a wetting agent and a thickener to facilitate the application of the dye composition and which preferably do not contain any inorganic salts.

The above defined compositions may serve as the starting point for the manufacture of dye creams. The substantial reduction in electrolyte content and the use of a thio-reducer which both constitute the essential features of the invention make it possible to prepare creams that are stable, having a colour ranging from white to pink and the commercial appearance of which remains ideal with time.

Moreover, it is possible to disperse in such dye compositions in the form of creams products such as lecithine, cholesterine, vitamins and the like, for which they form an ideal vehicle.

In using such dye creams, it is simply necessary at the time of use to add thereto just as in the conventional procedure, hydrogen peroxide at 20 volume concentration or any other equivalent oxidizer.

Some examples of dye creams prepared according to the invention will now be given.

*Example IV*

| | | |
|---|---|---|
| Emulsionizable propylene glycol stearate | g | 5 |
| Cholesterol | g | 0.2 |
| Vitamin F | g | 0.05 |
| Distilled water | cc | 51 |
| An ammonia solution of oxidizing dyestuffs depending on the desired tint (as see Examples I through III) | cc | 55 |
| Thioglycollic acid | g | 0.2 |

*Example V*

| | | |
|---|---|---|
| Emulsionizable cetyl-oleic alcohol | g | 10 |
| Cholesterol | g | 0.2 |
| Vitamin F | g | 0.05 |
| Water | cc | 50 |
| Ammonia solution of dyestuffs according to the desired tint (see Examples I through III) | cc | 55 |
| Thioglycollic acid | g | 0.2 |

Particularly in the case of cream dyes it is essential to reduce to a minimum the electrolyte content. On the other hand it is possible to produce a liquid dye which does contain electrolytes and still exhibits the improved qualities secured by the present invention, on condition there is incorporated therein a substantial amount of thio-reducers: the specific proportions indicated in the above examples are by no means critical and the thioglycollic acid content for instance may be varied in the range of from 0.1 to 1% in weight.

What I claim is:

1. A hair dye cream composition comprising an oxidation dye base selected from the class consisting of phenylamines, phenylenediamines, phenols and aminophenols and an organic sulfhydryl compound to retard oxidation and deterioration of the cream during storage, said cream being free from ionizable inorganic salts.

2. The composition of claim 1 wherein the sulfhydryl compound is thioglycollic acid.

3. The composition of claim 2 wherein the thioglycollic acid is present in 0.1 to 1.0% by weight of the cream.

4. A liquid hair dye composition comprising an oxidation dye base selected from the class consisting of phenylamines, phenylenediamines, phenols and aminophenols and 0.1 to 1.0% by weight of an organic sulfhydryl compound to retard oxidation and deterioration of the hair dye composition during storage, said hair dye composition being free from ionizable inorganic salts.

EUGÈNE SCHUELLER.

REFERENCES CITED

The following references are of record in the file of this patent:

UNITED STATES PATENTS

| Number | Name | Date |
|---|---|---|
| 1,019,576 | Wolffenstein | Mar. 5, 1912 |
| 1,869,469 | Devine | Aug. 2, 1932 |
| 2,041,436 | Schulemann | May 19, 1936 |
| 2,261,094 | Speakman | Oct. 28, 1941 |
| 2,418,664 | Ramsey | Apr. 8, 1947 |
| 2,442,461 | Karrer | June 1, 1948 |

FOREIGN PATENTS

| Number | Country | Date |
|---|---|---|
| 12,902 | Great Britain | 1899 |
| 21,336 | Great Britain | 1894 |
| 117,071 | Australia | June 3, 1943 |

OTHER REFERENCES

Colman, "Uber die Entgiftung von . . . Haarfarbemitteln," Dermatologische Wochenschrift, December 1913, pages 1459–1462.

Winter, "Haarfarben and Haarfarbung," 1930, pages 64–66.

Fred Winter, "Hair Dyes of Today," Soap Perfumery and Cosmetics," December 1938, pages 1080–1084 and 1088.